2,415,310

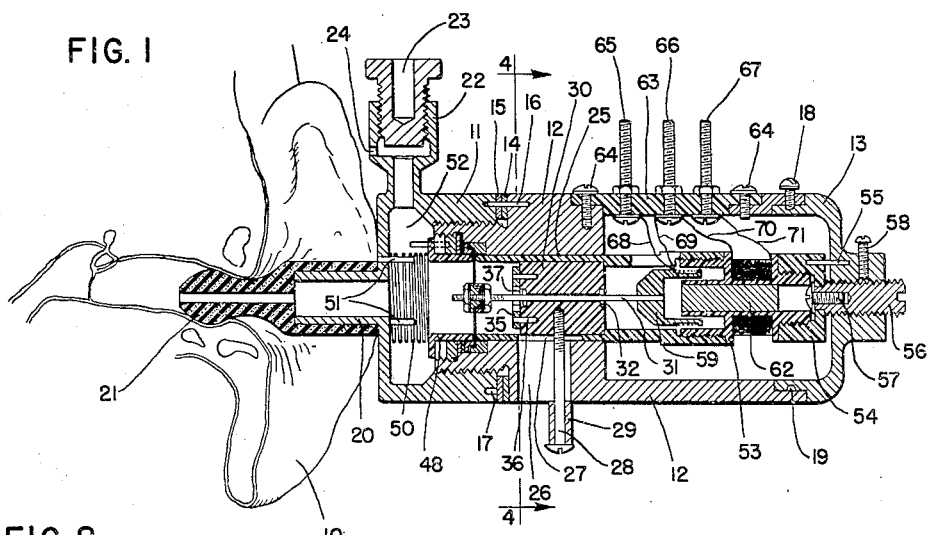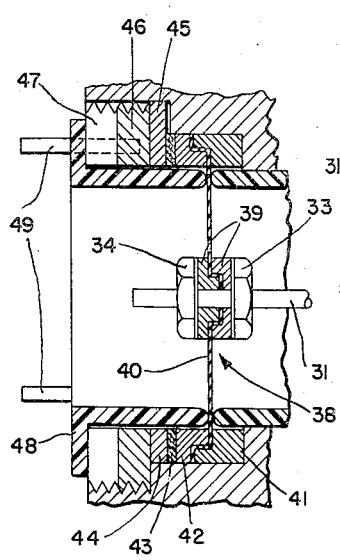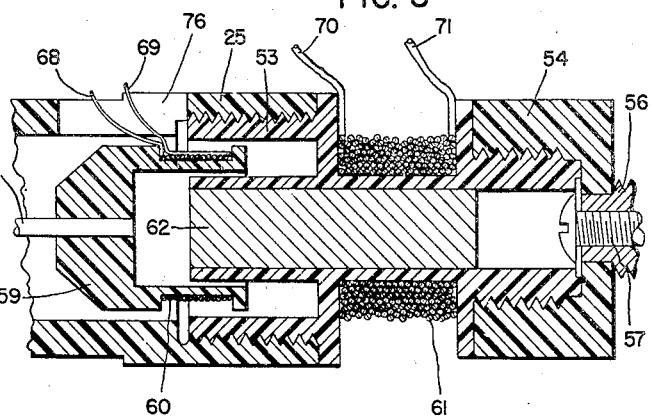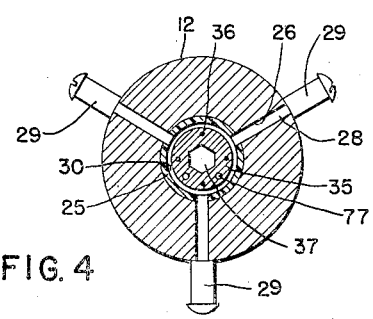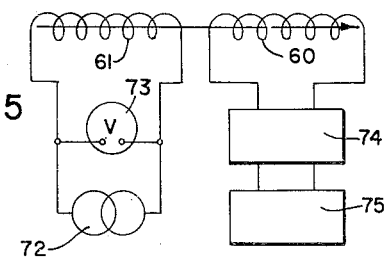
Feb. 4, 1947. D. V. SUMMERVILLE ET AL 2,415,310
DIAGNOSTIC INSTRUMENT
Filed Feb. 8, 1945
FIG. 1
FIG. 2
FIG. 3
FIG. 4
FIG. 5
INVENTOR.
DONALD V. SUMMERVILLE
HOWARD W. NAULTY
BY George F. Goodyear
ATTORNEY Patented Feb. 4, 1947

UNITED STATES PATENT OFFICE 2,415,310

DIAGNOSTIC INSTRUMENT

Donald V. Summerville, Fort Erie, Ontario, Canada, and Howard W. Naulty, East Aurora, N. Y., assignors, by mesne assignments, to Cornell Research Foundation, Inc., a corporation of New York Application February 8, 1945, Serial No. 576,840

4 Claims. (Cl. 128—2)

1

This invention relates to an instrument of novel purpose and design. More particularly, it relates to an instrument for measuring the frequency and magnitude of deflection of the tympanum of the human ear under varying atmospheric conditions. This instrument has been named by us a "tympanometer." Certain features of the instrument may also be used for other purposes.

In modern aviation, commercial and military airplanes very often ascend to considerable heights in the earth's atmosphere. In making such ascents, it is important that the human body be able to withstand without detriment the temperature and pressure changes to which it is subjected. One of the ways in which pressure changes affect the human body has been found to be in the form of deflections of the tympanum of the human ear, or the ear drum. These deflections often occur at high frequencies. The measurement of the amplitude and frequency of these deflections may accordingly be an important factor in determining the ability of an individual to withstand high altitude conditions without detriment.

It is therefore an object of this invention to provide an instrument for measuring the amplitude and frequency of deflections of the tympanum of the human ear. Another object is to provide such an instrument which is particularly useful for measuring such deflections at high altitudes. Other objects will appear hereinafter.

These objects are accomplished by the herein described and claimed instrument, which may be more readily understood by reference to the accompanying drawing, in which: Figure 1 is an enlarged longitudinal cross section of the instrument showing its relation to the human ear; Figures 2 and 3 are details of portions of Figure 1 on a still larger scale; Figure 4 is a view taken along the line 4—4 of Figure 1; and Figure 5 is a schematic wiring diagram of the instrument.

Referring now to Figure 1, the instrument itself is encased in a three-piece stainless steel cylindrical housing or frame including an inner section 11, an intermediate section 12 and an outer section 13. The sections 11 and 12 are threadably engaged, as shown, with a gasket 14 and a washer 15 interposed between them. The gasket and washer are held in place by means of a series of circumferentially spaced dowel pins 16 passing through circular holes in the gasket and washer and aligned in suitable bores in section 12 and an annular groove 17 in section 11. Sections 12 and 13 are arranged with a sliding fit therebetween, and are held together by circumferentially

2 spaced set screws 18 threaded through section 12 and engaging an annular groove 19 in section 13.

The inner section 11 is provided with a hollow stem 20 integral therewith and extending axially from its inner end. Fitted over this stem is a rubber nipple 21 capable of being inserted in the external opening or os of a human ear 10. Adjacent the inner end of section 11 there is also provided a peripheral opening from which there extends in a radial direction a hollow funnel-like extension 22, interiorly threaded as shown. A removable threaded plug 23 fits into this extension, for the reasons as hereinafter described. The side wall of the extension is provided with a bleeder opening 24, also for reasons as hereinafter described.

The intermediate section 12 is provided with a bore in which is slidably fitted a sleeve liner 25, preferably made out of insulating plastic, such as a polystyrene resin. Both the section 12 and the liner 25 are provided with aligned longitudinal slots 26 and 27, respectively, in which a tightening screw 28 is adapted to ride. A plurality of these slots and tightening screws may be spaced circumferentially about section 12. A collar 29 fits over the shank of each tightening screw to provide a finger hold by which the screw may be moved. The threaded inner end of each screw 28 engages a correspondingly threaded radial bore in a cylindrical block 30 which is adapted to slide within the liner 25. Thus, in the loosened condition of screws 28, block 30 may be moved axially by grasping the collars 29. When screws 28 are tightened, however, collars 29 are clamped between the heads of the screws and the peripheral surface of section 12.

The cylindrical block 30 is provided with an axial bore in which a rod 31 is adapted to slide. This rod rides on jewelled bearings or bushings 32 situated at the opposite ends of block 30. Referring to Figure 2, the inner end of this rod is threaded for the reception of a pair of hexagonal nuts 33 and 34. Affixed to the inner end of block 30 is a plate 35 held in place by pins or screws 36. The plate 35 has a central cut-out portion 37 adapted to fit over the nut 33. Thus it will be seen that nut 34 can be tightened or loosened, while holding nut 33 against rotation, by sliding block 30 until plate 35 fits over nut 33.

Between the nuts 33 and 34 is clamped a diaphragm assembly indicated generally at 38. This assembly consists of a pair of stainless steel washers 39 between which is gripped a flexible rubber diaphragm 40. The peripheral edges of the diaphragm 40 are gripped between a pair of stainless steel rings 41 and 42. Ring 41 fits into an annular recess formed between liner 25 and a set-back portion of housing section 12. A ring gasket 43 and a washer 44, the latter provided with a tab 45 fitting in a corresponding slot in the housing section 12 to prevent rotation thereof, fit against the ring 42. The assemblage of elements of 40, 41, 42, 43 and 44 is held firmly in place against a shoulder on housing section 12 by means of a threaded ring 46 having radial slots 47 for the insertion of a screw driver or similar tool. The abutting end of the sleeve 25 also assists in holding the diaphragm 40 in place, while a short flanged sleeve 48 of plastic material aligned with sleeve 25 bears against the opposite surface of the diaphragm. The sleeve 48 is properly aligned by means of a plurality of circumferentially spaced aligning pins 49 mounted on ring 46. It is held in position by means of a compression spring 50, which in turn is aligned by means of circumferentially spaced aligning pins 51.

It will be seen that the space to the left of diaphragm 40 forms a chamber 52 communicating with the exterior only through the funnel extension 22 and the nipple 21. In use, this space is filled with water or other liquid, which also fills the interior cavity of the ear between the tympanum and the nipple 21. The plug 23 is then screwed into the funnel 22, squeezing out excess liquid through the bleeder opening 24. The final turn of the screw plug 23 seals off the bleeder opening by seating of the plug against an internal shoulder on the extension 22. This must be done rather carefully, to avoid putting either the tympanum or the diaphragm 40 under tension. The diaphragm 40 and its associated clamping rings, washers, gaskets, etc., and also the gasket 14 between sections 11 and 12 are constructed to avoid leakage from the chamber 52. The chamber or space to the right of the diaphragm 40 is in communication with the atmosphere through slots 26 and 27 when the block 30 is in its normal or operating position, as shown in the drawings, so that this side of the diaphragm is always subjected to atmospheric pressure. A set of through-bores 77 allows equalization of pressure on opposite sides of the block 30.

Referring now to Figures 1 and 3, the outer end of sleeve 25 is threadably connected, as indicated, to a special fitting 53, preferably also made out of plastic insulating material. The outer end of fitting 53, in turn, is threaded to a plastic collar 54. The latter is kept from turning by means of an aligning pin 55, and is held on the end of a threaded stainless steel adjusting screw 56 by means of a retaining screw 57. The adjusting screw is threadably engaged with the housing section 13, and can be locked against turning by means of set screw 58. Thus it will be seen that the ensemblage consisting of the plastic elements 48, 25, 53 and 54 can be adjusted axially or longitudinally by turning adjusting screw 56, so as to secure proper positioning of the diaphragm 40. Turning the screw clockwise, as viewed from the right, will move the ensemblage to the left against the resistance of spring 50, while turning in the opposite direction will eventually cause sleeve 30 to draw away from diaphragm 40.

On the outer end of rod 31 (see Figure 3) there is mounted a cup-shaped fitting 59 of insulating plastic material. On the cylindrical surface of this fitting a coil of wire 60 is wound, the ends of this coil being suitably affixed, such as by cementing, to the fitting. This coil may be single-layered or multi-layered, and preferably lies in a wide shallow groove, provided for this purpose, on fitting 59. A second coil of wire 61, preferably multi-layered, is wound on fitting 53 as shown. The two coils 60 and 61 are electrically connected to the exterior, as hereinafter described. A soft iron core 62 held in the fitting 53 serves as the medium for inducing a current in coil 60 by means of a current in coil 61.

A portion of the cylindrical surface of housing section 12 is cut out, and the cut out portion filled by means of a curved rectangular plate 63 of insulating plastic material held in place by retaining screws 64. Three metallic binding posts or terminals 65, 66 and 67 are held in this plate 63. A conducting wire 68 connects post 65 with one end of coil 60, and a second conducting wire 69 connects the post 66 to the opposite end of coil 60. The two wires 68 and 69 pass through an elongated slit 76 in element 25, provided for this purpose. A third conducting wire 70 connects one end of coil 61 with post 66, and a fourth conducting wire 71 connects the opposite end of coil 61 with post 67. Post 66 thus serves as a common ground for both coils 60 and 61.

In operation, a high frequency alternating current at a controlled voltage is passed through a coil 61, whereby an induced current is set up in coil 60 through the medium of the soft iron core 62. As shown in the drawings, the coil 60 only partially overlaps iron core 62. As the rod 31 moves back and forth due to movement of the diaphragm 40, the amount of overlap of the coil 60 on core 62 varies, and consequently the induced current and the voltage in coil 60 varies. From the previous description, it will be seen that any deflection of the tympanum, due to atmospheric pressure changes or for other reasons, will tend to cause a corresponding change in volume in the chamber 52 and the space between the chamber and tympanum. Since this chamber and space is completely filled with a liquid which is relatively incompressible and inexpansible, a wall of the chamber must deflect simultaneously with the tympanum so as to maintain a constant volume. The only place that this can occur with relative ease is at the diaphragm 40. Movement of diaphragm 40 in turn causes a corresponding movement of rod 31 and coil 60. Consequently, it is seen that any deflection of the tympanum causes a change in the induced current passing through coil 60.

In Figure 5 there is shown a schematic wiring diagram for use with the instrument shown in Figures 1 to 4 inclusive. An oscillator 72 of conventional type supplies current to the fixed coil 61 at a fixed frequency, such as 24 kilocycles. The voltage of this current is measured and regulated by means of an adjusting vacuum tube voltmeter 73. The induced current in coil 60 is fed into an amplifier 74, and the amplified current then fed into a suitable recording instrument 75, such as an oscillograph. For the sake of clearness, the wiring for the two coils is shown entirely separate in Figure 5. In practice, however, as shown in the remaining figures, one terminal on each coil is grounded.

The instrument described above may be attached to the head of the wearer by any suitable harness or head gear, not shown.

From the above description, it will be seen that there has been provided a simple compact instrument for measuring and recording deflections of the tympanum of the human ear. Certain features of the instrument may also be used for other purposes. Other variations from the form of the invention described herein are also possible. Thus, the actuating rod 31 may be connected to a variable capacitor instead of a variable inductor. Instead of being wired, any suitable part of the electrical circuits may be connected to the instrument by radio, as well known in the art. It is understood that the invention is not to be limited except as defined in the appended claims.

We claim:

1. An instrument for measuring deflections of the tympanum, comprising a nipple for insertion in the natural os of an animate ear, a passageway extending through said nipple, a chamber communicating with said passageway, a readily deflectable wall bounding said chamber on one side thereof and deflectable upon movement of liquid through said passageway due to deflection of the tympanum, said chamber when closed being substantially liquid tight except on the side communicating with said passageway and being entirely bounded by relatively rigid walls except for said deflectable wall, and means for measuring the deflection of said deflectable wall.

2. An instrument for measuring deflections of the tympanum, comprising a housing, a nipple for insertion in the natural os of an animate ear, a passageway extending through said nipple, a chamber communicating with said passageway, an opening for the introduction of liquid into said chamber, a closure for said opening, a readily deflectable wall bounding said chamber on one side thereof and deflectable upon movement of liquid through said passageway due to deflection of the tympanum, said chamber when closed being substantially liquid tight except on the side communicating with said passageway and being entirely bounded by relatively rigid walls except for said deflectable wall, and means for measuring the deflection of said deflectable wall.

3. An instrument for measuring deflections of the tympanum, comprising a housing, a nipple for insertion in the natural os of an animate ear, a passageway extending through said nipple, a chamber communicating with said passageway, an opening for the introduction of liquid into said chamber, a closure for said opening, a readily deflectable wall bounding said chamber on one side thereof and deflectable upon movement of liquid through said passageway due to deflection of the tympanum, said chamber when closed being substantially liquid tight except on the side communicating with said passageway and being entirely bounded by relatively rigid walls except for said deflectable wall, a movable inductance coil connected to said deflectable wall and responsive to deflections thereof, a fixed inductance coil, and a core common to both said coils, one of said coils being adapted to carry an alternating current of substantially fixed voltage whereby a current is induced in the remaining said coil through the medium of said core, and said core being so positioned that the magnitude of said induced current depends upon the position of said movable coil.

4. An instrument for measuring deflections of the tympanum, comprising a housing, a nipple for insertion in the natural os of an animate ear, a passageway extending through said nipple, a chamber communicating with said passageway, an opening for the introduction of liquid into said chamber, a closure for said opening, a readily deflectable wall bounding said chamber on one side thereof and deflectable upon movement of liquid through said passageway due to deflection of the tympanum, said chamber when closed being substantially liquid tight except on the side communicating with said passageway and being entirely bounded by relatively rigid walls except for said deflectable wall, a movable inductance coil connected to said deflectable wall and responsive to deflections thereof, a fixed inductance coil mounted on said housing, and a fixed core common to both said coils, said fixed coil being adapted to carry an alternating current of substantially fixed voltage whereby a current is induced in said movable coil through the medium of said core, and said core being so positioned that the magnitude of said induced current depends upon the position of said movable coil with respect to said core.

DONALD V. SUMMERVILLE.
HOWARD W. NAULTY.

REFERENCES CITED

The following references are of record in the file of this patent:

UNITED STATES PATENTS

| Number | Name | Date |
|---|---|---|
| 2,139,509 | Marcellus | Dec. 6, 1938 |